US010995973B2

(12) United States Patent
Gottschall et al.

(10) Patent No.: US 10,995,973 B2
(45) Date of Patent: May 4, 2021

(54) COOLING DEVICE AND A METHOD FOR COOLING

(71) Applicant: TECHNISCHE UNIVERSITÄT DARMSTADT, Darmstadt (DE)

(72) Inventors: Tino Gottschall, Dresden (DE); Konstantin P. Skokov, Darmstadt (DE); Oliver Gutfleisch, Darmstadt (DE)

(73) Assignee: TECHNISCHE UNIVERSITÄT DARMSTADT, Darmstadt (DE)

( * ) Notice: Subject to any disclaimer, the term of this patent is extended or adjusted under 35 U.S.C. 154(b) by 239 days.

(21) Appl. No.: 16/307,697

(22) PCT Filed: Jun. 6, 2017

(86) PCT No.: PCT/EP2017/063642
§ 371 (c)(1),
(2) Date: Dec. 6, 2018

(87) PCT Pub. No.: WO2017/211778
PCT Pub. Date: Dec. 14, 2017

(65) Prior Publication Data
US 2019/0301775 A1 Oct. 3, 2019

(30) Foreign Application Priority Data

Jun. 6, 2016 (DE) .................. 10 2016 110 385.3

(51) Int. Cl.
*F25B 21/00* (2006.01)

(52) U.S. Cl.
CPC ...... *F25B 21/00* (2013.01); *F25B 2321/0021* (2013.01); *F25B 2321/0022* (2013.01); *Y02B 30/00* (2013.01)

(58) Field of Classification Search
CPC ............... F25B 21/00; F25B 2321/001; F25B 2321/0022; F25B 2321/0023; H01F 1/012
See application file for complete search history.

(56) References Cited

U.S. PATENT DOCUMENTS

| 4,408,463 A | * | 10/1983 | Barclay | ........... F25B 21/00 62/3.1 |
| 5,156,003 A | * | 10/1992 | Yoshiro | ........... F25B 21/00 62/3.1 |

(Continued)

FOREIGN PATENT DOCUMENTS

| DE | 102006014596 A1 | 10/2007 |
| DE | 602004007299 T2 | 2/2008 |

(Continued)

OTHER PUBLICATIONS

International Search Report dated Aug. 25, 2017 in corresponding/related International Application No. PCT/EP2017/063642.

(Continued)

*Primary Examiner* — Frantz F Jules
*Assistant Examiner* — Erik Mendoza-Wilkenfel
(74) *Attorney, Agent, or Firm* — Patent Portfolio Builders PLLC

(57) ABSTRACT

A cooling apparatus includes a magnetocaloric material, a magnetizing device, a converting device for applying pressure or tension to the magnetocaloric material, and a movement mechanism to move the magnetocaloric material. The magnetocaloric material changes its temperature when there is a change in an external magnetic field and when there is a change in an applied pressure. The movement mechanism moves the magnetocaloric material to expose it alternatingly to the external magnetic field and the change in pressure and (Continued)

to cause a periodic temperature change in the magnetocaloric material, whereby periods of lower temperature can be used for cooling.

12 Claims, 5 Drawing Sheets

(56) References Cited

U.S. PATENT DOCUMENTS

| | | | |
|---|---|---|---|
| 6,367,281 B1 | 4/2002 | Hugenroth | |
| 7,596,955 B2 | 10/2009 | Muller et al. | |
| 8,016,952 B2 | 9/2011 | Ishida et al. | |
| 10,018,385 B2* | 7/2018 | Radermacher | C09K 5/14 |
| 10,119,059 B2* | 11/2018 | Cui | F25B 23/00 |
| 2010/0146989 A1* | 6/2010 | Egolf | F25B 21/00 62/3.1 |
| 2012/0273158 A1 | 11/2012 | Cui et al. | |
| 2016/0017462 A1* | 1/2016 | Samanta | C22C 30/00 420/581 |
| 2016/0084544 A1 | 3/2016 | Radermacher et al. | |
| 2016/0216012 A1 | 7/2016 | Benedict et al. | |
| 2017/0336108 A1 | 11/2017 | Muller | |

FOREIGN PATENT DOCUMENTS

| | | |
|---|---|---|
| DE | 112006001628 T5 | 5/2008 |
| FR | 3028927 A1 | 5/2016 |

OTHER PUBLICATIONS

Mañosa et al., "Advanced materials for solid-state refrigeration," Journal of Materials Chemistry A, Jan. 2013, 1, pp. 4925-4936.

Mañosa et al., "Giant solid-state barocaloric effect in the Ni—Mn—In magnetic shape-memory alloy," Nature Materials, Jun. 2010, vol. 9.

Qian et al., "A review of elastocaloric cooling: Materials, cycles and system integrations," International Journal of Refrigeration, Apr. 2016, vol. 64, pp. 1-19.

Written Opinion dated Aug. 25, 2017 in corresponding/related International Application No. PCT/EP2017/063642.

\* cited by examiner

COOLING DEVICE AND A METHOD FOR COOLING

The present invention relates to a cooling apparatus and method for cooling, and more particularly to a cooling apparatus based on a magnetocaloric cooling principle by utilizing thermal hysteresis.

BACKGROUND

In many technical fields it is important to cool materials or spaces as efficiently as possible. For example, air conditioners or refrigerators consume a considerable amount of energy. Therefore, we are constantly striving to improve existing cooling technologies or to use alternative cooling concepts for cooling.

Such a cooling method uses the so-called magnetocaloric effect (MCE), which is based on a temperature change of a material by applying a magnetic field. A variety of materials are generally suitable. However, known magnetocaloric refrigeration units require very large-scale magnets to generate the necessary magnetic field, whereby permanent magnets are used. For this reason, existing refrigeration units of this type are typically many times larger or heavier than conventional compressor-based systems. And in addition the associated material costs are not inconsiderable. Therefore, magnetic cooling is currently not competitive with conventional cooling technologies.

On the other hand, magnetic cooling methods promise high efficiency, since in these systems, among other things, no compressors or other hydraulic-pneumatic systems are required to achieve a cooling effect.

FIG. 5 illustrates the operating principle of a known AMR device (AMR=active magnetic regenerator). The magnetocaloric material 310 (MCE material), which changes its temperature when a magnetic field is applied, is rotatably arranged in the form of a ring between two magnetic units 320. The magnetic units 320 in this conventional AMR device are typically permanent magnets and designed so that the magnetocaloric material 310 is exposed to a sufficiently strong magnetic field to achieve a significant temperature change of the MCE material 310.

To operate efficiently, the MCE material 310 shown in FIG. 5 rotates. However, it is also possible that the magnet unit 320 rotates. There are two heat exchange phases: (1) dissipation of heat in the magnetic field and (2) absorption of heat without a magnetic field. When the MCE material 310 leaves the magnetic units 320, the temperature of the MCE material 310 has increased and the heat may dissipate. For this purpose, for example, an exchange fluid can be pumped through the annular MCE material 310. In order not to void the achieved magnetocaloric effect, the magnetic field is maintained throughout the pumping process. Only when the temperature of the MCE material 310 has adapted to the ambient temperature, the magnetic field (or the magnetic unit 320) is removed and the reverse magnetocaloric effect occurs. Since the magnetocaloric effect has caused magnetization heating, which can be released to the environment using the exchange fluid, the reverse magnetocaloric effect (when the magnetic field is turned off) achieves cooling (which can be used for cooling). Depending on the cycle where the system is located, the exchange fluid can be pumped in different directions.

In the conventional magnetocaloric aggregates, materials are typically used which have high reversibility. In order to enable the high reversibility and thus the lowest possible loss of cooling, materials are used in these refrigeration units, which have no or the least possible thermal hysteresis. Materials having these properties have been continuously refined and include, for example: gadolinium, La (Fe, Si, Co) 13, La (Fe, Si, Mn) 13Hx or Fe2P alloys.

As stated, this is a disadvantage of these systems with the large permanent magnets, which are required in order to allow the strong magnetic field to act on the MCE material 310 as extensively as possible. For example, half of the volume of the magnetocaloric material 310 was exposed to the magnetic field. The corresponding cooling units are therefore not only heavy, but they are also associated with enormous costs.

Therefore, there is a need for alternative magnetic cooling technologies that do not require large permanent magnets and make magnetic cooling cheaper.

SUMMARY

The present invention relates to a cooling device having a magnetocaloric material, a magnetizing device for forming an external magnetic field, and a converting device for applying pressure or tension to the magnetocaloric material. The magnetocaloric material is selected such that it changes its temperature when there is a change in an external magnetic field and a change in applied pressure. The cooling apparatus further comprises a means of movement, which are configured to move the magnetocaloric material relative to the magnetizing means and the converting means so that the magnetocaloric material is alternatingly exposed to a change in the external magnetic field and a change in pressure/tension, so as to cause a periodic temperature change in the magnetocaloric material. Periods of lower temperature can then be used for cooling.

With further embodiments, the magnetocaloric material has a first phase and a second phase, and phase transitions between the first phase and the second phase via thermal hysteresis are triggered by a change in the external magnetic field and/or the pressure/tension. In particular, these phase transitions are first order magnetostructural phase transitions where there is a transition to structural changes in the magnetocaloric material (e.g., a changed crystal structure). The magnetization device and the conversion device are therefore designed to trigger this phase transition between the first phase and the second phase and the associated structural transformations. This means that the pressure (or tension) and magnetic field are changed sufficiently to initiate the conversion process and the phase transition associated with it, if possible over an entire cross section of the magnetocaloric material. Otherwise, if the pressure (or tension) and/or the magnetic field is insufficient, the phase transition may only occur partially in the magnetocaloric material (or be triggered only on one surface).

The defined periodic change in temperature due to periodic change in the magnetic field corresponds to passing through thermal hysteresis. Embodiments of the present invention specifically use hysteresis, since in this way the magnetic field can be applied only for a short period of time or spatially localized, without immediately initiating the reversal process.

Magnetocaloric materials can show the normal magnetocaloric effect or the inverse magnetocaloric effect. In the normal magnetocaloric effect, the temperature when configuring a magnetization increases as compared with the non-magnetic case, while in the inverse magnetocaloric material, the temperature decreases when the magnetocaloric material is exposed to the external magnetic field. The cause of the temperature decrease is the magnetostructural conversion in the material. Although both materials are usable in principle, according to further embodiments, a magnetocaloric material with inverse magnetocaloric effect is preferred.

In embodiments of the present invention, the stable phase for higher temperatures (high temperature phase) is the magnetized phase, while the stable phase for lower temperatures (low temperature phase) is a phase with no or less magnetization.

In further embodiments, the magnetocaloric material is at least partially linearly (rectilinear) formed and the means of movement comprise a translation device which is configured to alternatingly move the magnetocaloric material back and forth to provide the alternating motion to achieve periodic temperature changes in the magnetocaloric material.

In other embodiments, the magnetocaloric material is annular and the means of movement includes a rotating device configured to rotate the annular magnetocaloric material to achieve a periodic temperature change in segments of the annular magnetocaloric material. In this embodiment, the means of movement and the conversion device may form one unit. For example, pressure rollers can be used that are driven by a motor and move the magnetocaloric material forward by applying pressure. Here, the applied pressure can be chosen that is sufficiently strong to trigger the transition phase in the magnetocaloric material. The motor as a moving means can therefore move the magnetocaloric material while pressure is applied. Optionally, the magnetization device and the conversion device can also move while the magnetocaloric material remains at rest. Often, the first case is easier to implement. The rotation can only take place in one direction or alternatingly in opposite directions.

Accordingly, in other embodiments, the magnetization device comprises at least one magnetic unit and the conversion device at least one pressure roller so that the means of movement moves the magnetocaloric material alternatingly through the at least one pressure roller and through the at least one magnetic unit. The magnetocaloric material may thus undergo thermal hysteresis during movement, wherein at least one pressure roller exerts minimum pressure and the at least one magnetic unit applies minimum magnetic field strength to the magnetocaloric material to trigger the transitions between the first phase and the second phase.

The use of pressure rollers has the advantage that they can simultaneously provide a support for the magnetocaloric material. For example, two or more pressure rollers (e.g. symmetrically) may be configured along an annular magnetocaloric material. The magnetizer need not have direct contact with the magnetocaloric material. For example, the magnetocaloric material moves through a gap between two opposing pole shoes, between which a strong magnetic field is created, which again is strong enough to traverse the hysteresis loop.

In further embodiments, the cooling device further comprises at least one exchange fluid thermally coupled to the magnetocaloric material and configured to heat portions of the magnetocaloric material at a lower temperature and to cool higher temperature portions.

In further exemplary embodiments, the exchange fluid is water, which is pumped to and from the magnetocaloric material. A low-temperature area can, for example, be connected to a medium to be cooled via a first exchange fluid and thus absorb heat. A high-temperature area, on the other hand, can release heat into the surrounding area via a second exchange fluid (e.g. the outside of a refrigerator or the surrounding area of an air conditioning unit). Water can be used, for example, as an exchange fluid for both circuits.

In further exemplary embodiments, the magnetocaloric material comprises, for example, one of the following materials: Gd—Si—Ge, La—Fe—Si—Mn—H, Fe—P, Heusler or semi-Heusler alloys, Fe—Rh, Mn—Ga or a combination thereof.

The present invention also relates to a cooling unit with at least one of the previously defined cooling apparatuses. Two or more cooling apparatuses can optionally be present, serially connected to one another so as to multiply the temperature reduction.

The present invention also relates to a method for cooling. The method comprises the following steps: moving of a magnetocaloric material; forming of an external magnetic field; and applying of a pressure or tension to the magnetocaloric material. The magnetocaloric material changes its temperature via the external magnetic field and as a result of the applied pressure. Through the movement, the magnetocaloric material is alternatingly exposed to the external magnetic field and the pressure so that a periodic temperature change is achieved in the magnetocaloric material, whereby periods of lower temperature can be used for cooling In further exemplary embodiments, the forming of the external magnetic field comprises an adiabatic magnetization and the applying of the pressure comprises a change in the pressure (e.g. a pressure buildup and/or a pressure drop). The method can optionally comprise at least one of the following steps: adiabatic magnetization, adiabatic demagnetization, absorption of heat from a cooling chamber, adiabatic pressure buildup, adiabatic pressure drop and release of warmth into a surrounding area. During adiabatic demagnetization, the temperature does not need to change due to hysteresis.

The invention is not limited to a determined order of the method steps. In further exemplary embodiments, the method steps can be performed in another order.

The described exemplary embodiments thus achieve the above-mentioned technical effect by purposefully exploiting the thermic hysteresis of magnetocaloric materials with a first-order transition in combination with mechanical tension (or pressure). This approach offers the advantage that a considerable reduction in costs and weight can be achieved. Thus, the corresponding cooling units are produced at a considerably lower cost than conventional AMR devices and the permanent magnets can be drastically reduced with a simultaneous increase in the efficiency of the cooling circuit.

BRIEF DESCRIPTION OF THE FIGURES

The exemplary embodiments of the present invention are better understood through the following detailed description and the attached drawings of the various exemplary embodiments, which should not, however, be so understood that they limit the disclosure to the specific embodiments, but only serve for clarification and understanding.

DETAILED DESCRIPTION

Figure 1:
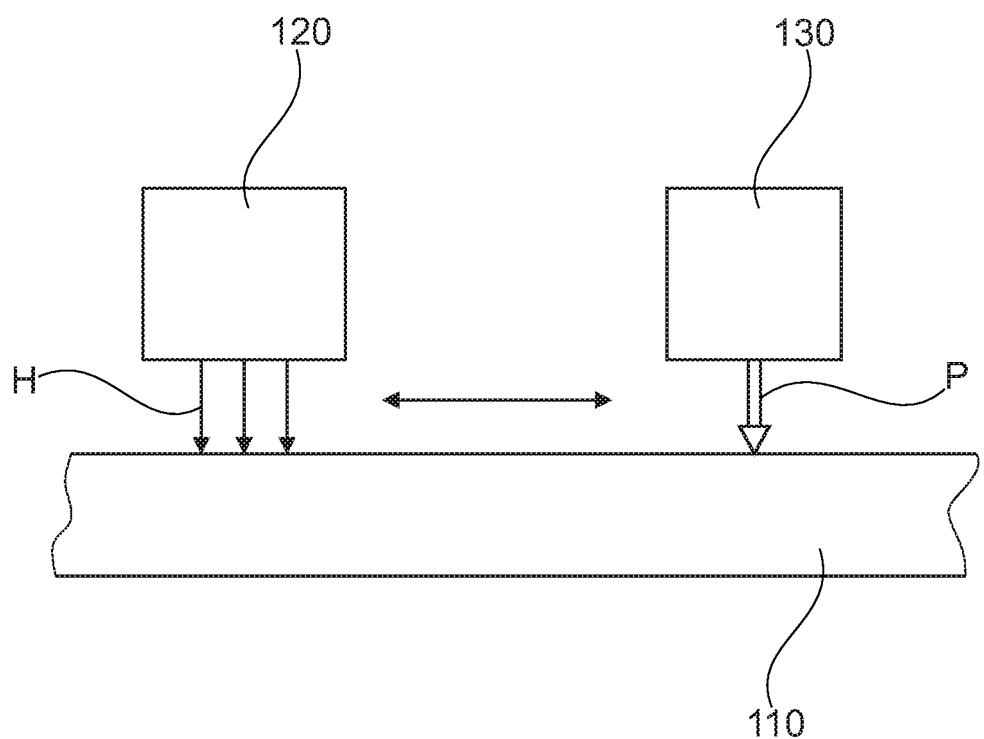
FIG. 1 shows a schematic representation of a cooling apparatus according to an exemplary embodiment of the present invention.

FIG. 1 shows an exemplary embodiment of a cooling apparatus with a magnetocaloric material no, a magnetizing device 120 to form a magnetic field H and a converting device 130 to apply a pressure P (or a tension) to the magnetocaloric material no. Moreover, the cooling apparatus comprises means of movement to move the magnetocaloric material no relative to the magnetizing device 120 and/or to the converting device 130 so that the magnetocaloric material no is alternatingly exposed to a change of the external magnetic field H and a change of the pressure P so as to cause a periodic temperature change in the magnetocaloric material 110, whereby periods of lower temperature can be used for cooling.

The movement can be, for example, an alternating forward and backward movement, which can run in straight lines and thus leads to the desired alternating change in the magnetic field H and the pressure P.

The magnetocaloric material 110 is designed to change its temperature upon forming the external magnetic field H and upon changing an applied pressure P. Unlike conventional systems, exemplary embodiments of the present invention do not use any materials that possibly do not comprise thermic hysteresis; instead, they use materials with which the hysteresis can purposefully be exploited. furthermore, exemplary embodiments use inverse magnetocaloric materials in particular, which cool upon forming a magnetic field and increase the temperature upon applying a pressure or tension. Thus, a cooling circuit can be easily achieved.

Figure 2:
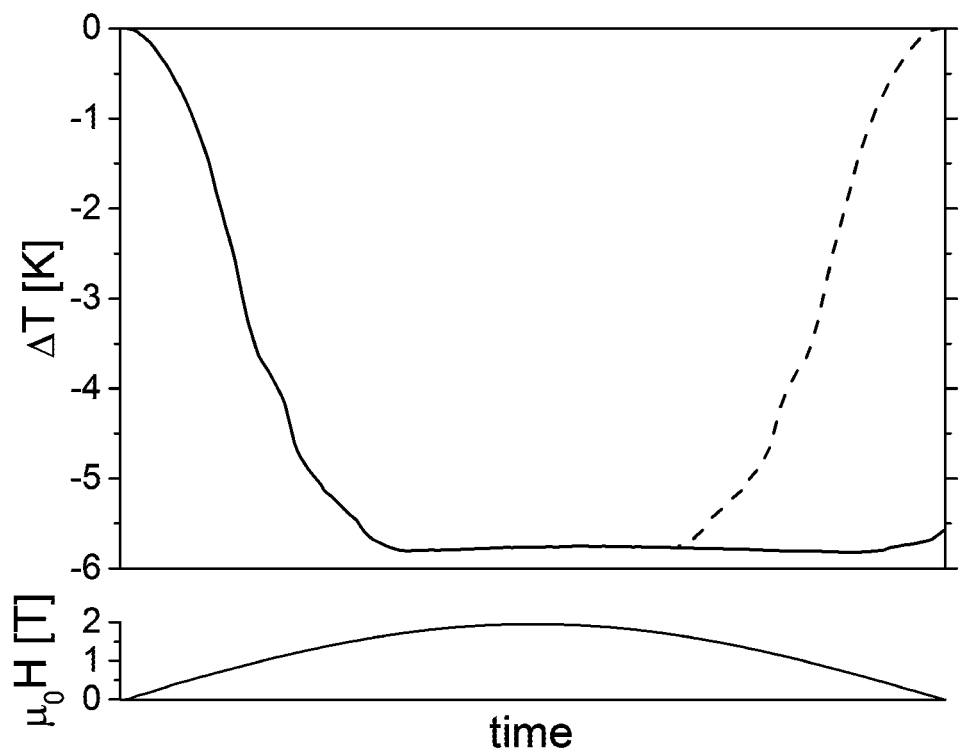
FIG. 2 shows the temperature dependency of a magnetocaloric material in connection with the field formed.

FIG. 2 shows a change in the temperature T of the exemplary inverse magnetocaloric material Ni—Mn—In—Co (as an example of a Heusler alloy) when a magnetic field H with an exemplary T of 2 is formed and removed again. Under the temperature sequence, the corresponding time sequence of the magnetic field H is represented. In the illustrated inverse magnetocaloric material 110, cooling of approx. 6 K is observed. Since the change takes place via thermic hysteresis, this temperature drop is maintained—even if the magnetic field is removed again (solid line on the right side of the graphic representation).

For comparison, the temperature sequence of a sample is also shown in FIG. 2, as it is used in conventional AMR systems with a completely reversible change (dotted line). As a result of the reversibility, the temperature rises in these conventional systems after fully turning off the magnetic field again and the initial state is achieved again.

Unlike conventional AMR systems, exemplary embodiments purposefully use the hysteresis effect. It is accordingly not necessary to maintain the magnetic field H during the pumping process. The magnetocaloric effect is irreversible in exemplary embodiments, i.e. the magnetizing curves proceed along various paths for the transformation between phases (see FIG. 4 below).

The use of hysteresis offers the advantage that the magnetic field H is only necessary in a very small area or volume. The cooling effect takes place in this area. The magnetic field is thus very strongly concentrated and considerably higher magnetic fields can be produced than is possible with the conventional AMR devices from FIG. 5, where a very large volume must be magnetized.

Exemplary embodiments therefore do not need any large permanent magnets and can still generate a considerably stronger magnetic field. Since the magnetocaloric effect, i.e. the temperature change with the magnetic field, increases with the strength of the magnetic field, an increase in efficiency thus becomes possible.

Figure 3:
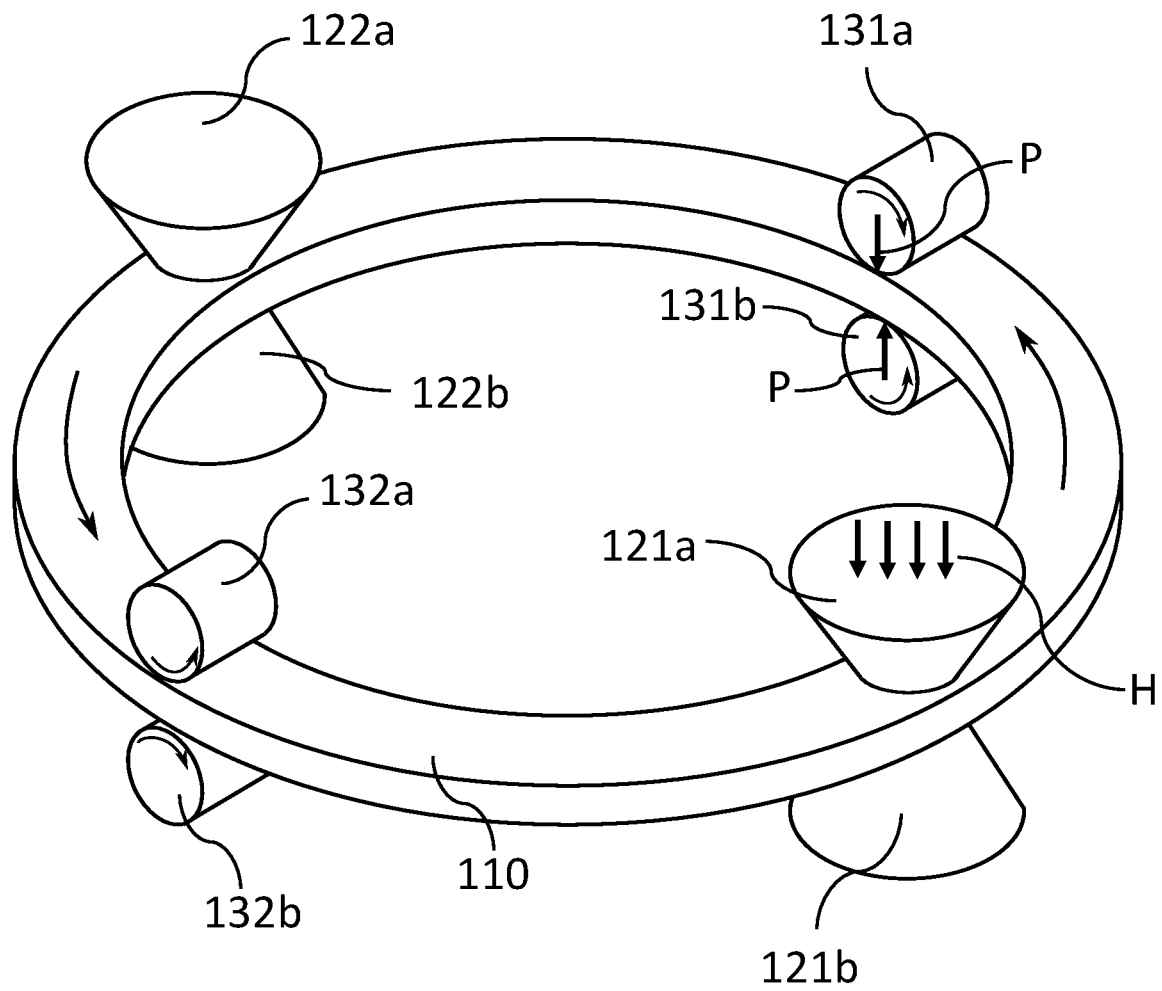
FIG. 3 shows a schematic design of a hysteresis-based cooling apparatus, wherein a magnetocaloric material in the form of a ring is mounted rotatingly between two magnetic and pressure units.

FIG. 3 shows a schematic design of a cooling apparatus that uses hysteresis, whereby the magnetocaloric material 110 in the form of a ring is mounted rotatingly between two magnetic units 121, 122 (magnetizing device 120) and two pressure units 131, 132 (converting device 130).

The first magnetic unit 121 comprises a first magnetic shoe 121a and a second pole shoe 121b, which are mounted on opposing sides of the magnetocaloric material no and create a gap, in which the magnetocaloric material 110 is located. The pole shoes 121a, 121b concentrate the magnetic field in the gap to magnetize the magnetocaloric material no with a high magnetic field strength H. The second magnetic unit 122 can also have a first pole shoe 122a and a second pole shoe 122b, which also create a gap between the pole shoes 122a, 122b of the second magnetic unit 122, in which the magnetocaloric material 110 is located and can be exposed to the magnetic field H. The first magnetic unit 121 and the second magnetic unit 122 can be connected with a permanent magnet or an electromagnet so as to form the necessary magnetic field in the gaps between the pole shoes 122a, 122b, 121a, 121b.

The converting device 130 is designed as a rolling system in FIG. 3, whereby the first pressure unit 131 comprises a first pressure roller 131a and a second pressure roller 131b, which are mounted rotatably on two opposing sides of the magnetocaloric material 110 so as to apply the pressure P to the magnetocaloric material 110. The second pressure unit 132 comprises a first pressure roller 132a and a second pressure roller 132b, which are also mounted rotatably on opposing sides of the magnetocaloric material 110 and apply the pressure P to the magnetocaloric material 110.

The pressure rollers 131a, 131b, 132a, 132b can optionally be operated by the means of movement (not shown) to move the magnetocaloric material 110 as the pressure P is applied (e.g. in a counterclockwise direction, as shown in FIG. 3). Since a relative movement is sufficient, the means of movement can also be designed to move the pressure units 131, 132 and the magnetic units 121, 122 while the magnetocaloric material 110 is held in place.

It is understood that in further exemplary embodiments, more than two pressure units 131, 132 and/or more than two magnetic units 121, 122 may be present and the invention should not be limited to a determined number. Moreover, the first pressure unit 131 and the second pressure unit 132 can, as shown in FIG. 3, be mounted in diametrically opposing positions of the magnetocaloric material 110 in the form of a ring. The magnetocaloric material 110 can thus simultaneously be held mechanically.

Figure 5:
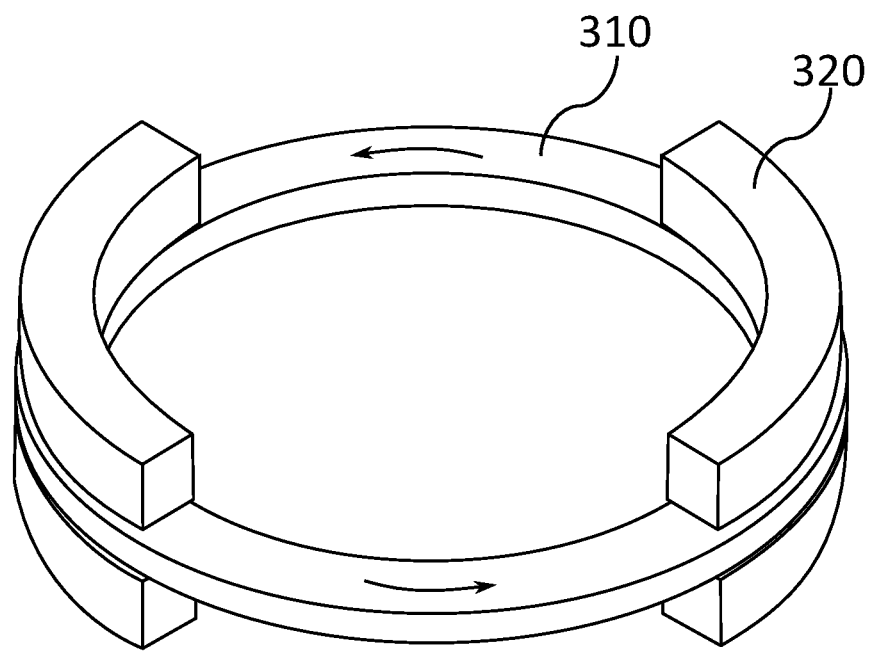
FIG. 5 shows a schematic design of a conventional AMR device.

In comparison with the conventional arrangement from FIG. 5, such a considerable reduction in magnets (or the exemplary permanent magnet material) becomes possible. Moreover, the pole shoes 121, 122 can be designed such that a focusing of the magnetic field H is achieved. The overall process can furthermore occur cyclically, whereby the two rolling systems 131, 132 are used to apply the pressure P and simultaneously return the magnetocaloric material 110 to its initial state (limited magnetization). The cyclical overall process is possible because the running structural transformation during the first-order transition can be induced by applying a pressure or a mechanical tension.

Figure 4:
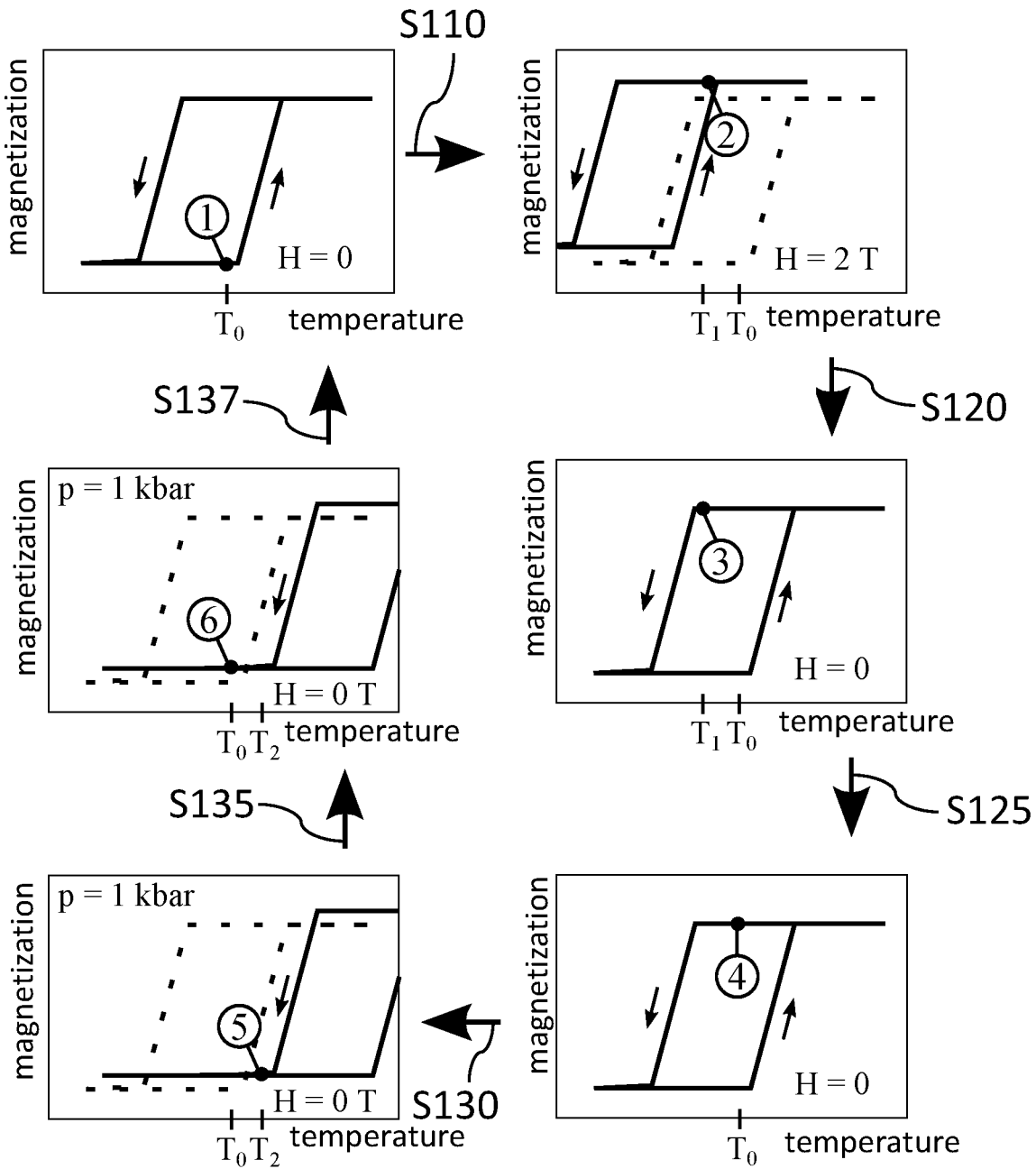
FIG. 4 exemplifies the schematic active principle of the hysteresis-based cooling circuit according to exemplary embodiments.

FIG. 4 exemplifies the schematic active principle of the cyclical cooling process, which can be schematically exemplified with six states in the magnetization-temperature diagram. Ni—Mn—In—Co can be used, for example, as a magnetocaloric material.

The magnetization-temperature diagrams show two stable phases, a low-temperature phase and a high-temperature phase. The low-temperature phase is the phase that is stable at low temperatures (left of the hysteresis curves in the diagrams), while the high-temperature phase is the phase that is stable at high temperatures (right of the hysteresis curves in the diagrams). The transition between the phases takes place through the represented hysteresis curves. It is understood that, in connection with the previous history, the high-temperature phase can also exist in the hysteresis area at temperatures that are lower than the temperatures in which the low-temperature phase is (still) stable.

The process begins, for example, in state 1 (top left in FIG. 4). The magnetocaloric material no is located here in the low-temperature phase with a low magnetization with an initial temperature T0.

By applying S110 the external magnetic field, an adiabatic magnetization takes place and the hysteresis curve shifts to the left. A transition to the high-temperature phase takes place with high magnetization (state 2). The adiabatic magnetization S110 ensures (no or nearly no heat exchange takes place with the surroundings) that the temperature will drop during this transition. The temperature can be dropped, for example, from the initial temperature T0 to a temperature T1 by forming the magnetic field. Since the curve has shifted to the left, the magnetocaloric material 110 is still in the high-temperature phase, even if the temperature in the magnetocaloric material 110 has been reduced as a result of the inverse MCE.

Due to the thermic hysteresis, the return to the low-temperature phase does not take place on its own not even when the external magnetic field H is turned off and an adiabatic demagnetization S120 follows S110. This is the case in state 3, where the temperature accordingly remains at the value T1. An adiabatic demagnetization S120 occurs in FIG. 3 when the magnetocaloric material 110 leaves the gap between the pole shoes 121, 122. It is understood that the demagnetization relates to the external magnetic field. The magnetocaloric material 110 can, of course, also be further magnetized after turning off the external magnetic field.

The adiabatic state changes themselves take place without heat exchange with the surrounding area. An exchange fluid is not pumped through the cold magnetocaloric material 110 and used to cool a cooling chamber (i.e. for heat absorption), for example, until the next step S125. Thus, the temperature of the magnetocaloric material 110 rises from state 3 to state 4 again and once again achieves the initial temperature T0, for example, in state 4 (seen in the bottom right of FIG. 4). It is not necessary, however, for the initial temperature T0 to be achieved again in state 4.

The magnetocaloric material 110 is still in state 4 in the high-temperature phase (upper branch of the hysteresis curve). To return the magnetocaloric material 110 to the low-temperature phase, the pressure P (e.g. of approx. 1 kbar) is subsequently applied in step S130. The pressure buildup shifts the hysteresis curve to the right (see both representations below in FIG. 4). This return leads to a certain warming so that the magnetocaloric has the temperature T2>T0 in the resulting state 5 (bottom left in FIG. 4).

The excess heat can be absorbed by the exchange fluid in the subsequent step S135 (e.g. by using the corresponding pump) and released into the surrounding area. Thus, state 6 is achieved.

In the last step S137, the pressure P is reduced and the material is once again in the low-temperature phase with the initial temperature T0 (state 1).

The steps described may be performed or occur at least partially overlapping in time, parallel—they do not need to be temporally separated from one another.

This cyclical process can be performed continuously, during which time the magnetocaloric material 110 moves in a circle (see FIG. 3), for example, and the exchange fluid moves heat away or to the magnetocaloric material 110 (e.g. from the medium to be cooled). The exchange fluid is not shown and can be water, for example.

The overall magnetocaloric material 110 thus runs through a single Brayton-style thermodynamic cycle and contributes to cooling. Since a temperature gradient is built in the conventional AMR cycle and the reversible transition immediately begins after turning off the magnetic field, only a small portion of the magnetocaloric material can actually contribute to cooling. In conventional units, it is hardly possible to achieve greater temperature intervals or only at the cost of cooling capacity, since only a small portion of the MCE material provides for the cooling of the inner space. Unlike this, in exemplary embodiments of the present invention, the temperature interval to be achieved is determined by the temperature change of the magnetocaloric material no in the magnetic field H. Since considerably higher magnetic fields are possible in the circuit using hysteresis than in conventional AMR devices, a greater temperature change is available. Furthermore, the overall MCE material contributes to cooling in the present invention. Thus, exemplary embodiments achieve considerably greater efficiency when cooling.

In a magnetic field H of, for example, 2 T, temperature changes of 8 K can be achieved in Heusler alloys. Cooling units with two models serially connected one after the other and which work at varying operating temperatures can accordingly achieve a temperature reduction, for example, of 16 K. This would suffice, for example, to construct a simple cooling unit that can cool groceries from room temperature to considerably below 10° C.

Furthermore, exemplary embodiments of the present invention have the advantage that their efficiency is considerably greater than in conventional AMR devices since half of the magnetocaloric material actively participates in the cooling of the cooling chamber in such bimodular devices.

So long as a manipulable thermic hysteresis and/or a configurable transition temperature is present, each magnetocaloric material is essentially suitable for the magnetic cooling using hysteresis. This applies, for example, to all materials with a magnetostructural first-order transition, including, for example, the following materials: Gd—Si—Ge, La—Fe—Si—Mn—H, Fe—P, Heusler or semi-Heusler alloys, Fe—Rh, Mn—Ga. The inverse magnetocaloric materials, e.g. Mn—Ga, Fe—Rh and in particular the Heusler alloys, should be highlighted, as they cool down upon forming a magnetic field and it is thus simpler, for technical reasons, to use the cooling achieved, whereas they heat up during magnetization in conventional magnetocaloric materials.

The features of the invention disclosed in the description, claims and figures may be material to the implementation of the invention individually or in any combination.

REFERENCE LIST 110 magnetocaloric material
120 magnetizing device 121, 222 magnetic units (pole shoes)
130 converting device
131, 132 pressure rollers
310 conventional magnetocaloric material
320 conventional magnetizing device

The invention claimed is:
1. A cooling apparatus, comprising:
a magnetocaloric material, which changes temperature responsive to a change in an external magnetic field and responsive to a change in an applied pressure or tension;
a magnetizing device configured to form the external magnetic field;
a converting device configured to apply pressure or tension to the magnetocaloric material, wherein the magnetizing device and converting device are spatially separated from each other so that the external magnetic field of the magnetizing device is applied to a first section of the magnetocaloric material and the converting device applies the pressure or tension to a second section of the magnetocaloric material, and wherein the first and second sections of the magnetocaloric materials are spatially separated sections of the magnetocaloric materials;
means of movement configured to move the magnetocaloric material relative to the magnetizing device and the converting device so that the first section of the magnetocaloric material is exposed to the external magnetic field and the second part of the magnetocaloric material is exposed to the change in pressure or tension to cause a temperature change in the magnetocaloric material, and then the first section of the magnetocaloric material is exposed to the change in pressure or tension and the second section of the magnetocaloric material is exposed to the external magnetic field to cause a temperature change in the magnetocaloric material, whereby periods of lower temperature are useable for cooling.

2. The cooling apparatus of claim 1, wherein
the magnetocaloric material exhibits a first phase, a second phase, and a first-order magnetostructural phase transition between the first phase and the second phase via thermic hysteresis that is triggerable by a change in the external magnetic field and/or the pressure or the tension, and
the magnetizing device and the converting device are configured to trigger structural changes during the phase transition between the first phase and the second phase.

3. The cooling apparatus of claim 2, wherein the magnetocaloric material exhibits an inverse magnetocaloric effect.

4. The cooling apparatus of claim 1, wherein
the magnetocaloric material has a ring shape, and
the means of movement comprises a turning apparatus to turn the magnetocaloric material having the ring shape to achieve periodic temperature changes of segments of the magnetocaloric material having the ring shape with the turning movement.

5. The cooling apparatus of claim 2, wherein
the magnetizing device comprises at least one magnetic unit and the converting device comprises at least one pressure roller so that the means of movement alternatingly moves the magnetocaloric material through the at least one pressure roller and through the at least one magnetic unit, and the magnetocaloric material passes through thermic hysteresis during the movement, and the at least one pressure roller applies a minimum pressure and the at least one magnetic unit applies a minimum magnetic field strength to the magnetocaloric material to trigger transitions between the first phase and the second phase over an entire cross section of the magnetocaloric material.

6. The cooling apparatus of claim 1, wherein the magnetocaloric material forms a line at least in sections and the means of movement comprise a translation device configured to move the magnetocaloric material alternatingly forward and backwards to achieve periodic temperature changes in the magnetocaloric material with the alternating forward and backwards movement.

7. The cooling apparatus of claim 1, further comprising:
at least one exchange fluid thermally coupled to the magnetocaloric material and configured to heat portions of the magnetocaloric material at a lower temperature and to cool higher temperature portions.

8. The cooling apparatus of claim 7, wherein the at least one exchange fluid comprises water, the cooling apparatus further comprising:
a pump configured to pump the water to and from the magnetocaloric material.

9. The cooling apparatus of claim 1, wherein the magnetocaloric material comprises at least one of the following materials:
Gd—Si—Ge, La—Fe—Si—Mn—H, Fe—P, Heusler alloys, semi-Heusler alloys, Fe—Rh, and Mn—Ga.

10. A cooling unit, comprising:
at two cooling apparatuses with different operational temperatures, which are serially connected to one another so as to increase an achievable temperature reduction, wherein each of the two cooling apparatus comprise:
a magnetocaloric material, which changes temperature responsive to a change in an external magnetic field and responsive to a change in an applied pressure or tension;
a magnetizing device configured to form an external magnetic field;
a converting device configured to apply pressure or tension to the magnetocaloric material, wherein the magnetizing device and converting device are spatially separated from each other so that the external magnetic field of the magnetizing device is applied to a first section of the magnetocaloric material and the converting device applies the pressure or tension to a second section of the magnetocaloric material, and wherein the first and second sections of the magnetocaloric materials are spatially separated sections of the magnetocaloric materials;
means of movement configured to move the magnetocaloric material relative to the magnetizing device and the converting device so that the first section of the magnetocaloric material is exposed to the external magnetic field and the second part of the magnetocaloric material is exposed to the change in pressure or tension to cause a periodic temperature change in the magnetocaloric material, and then the first section of the magnetocaloric material is exposed to the change in pressure or tension and the second section of the magnetocaloric material is exposed to the external magnetic field to cause a temperature change in the magnetocaloric material, whereby periods of lower temperature are useable for cooling.

11. A method, comprising:
   applying an external magnetic field to a first section of a magnetocaloric material;
   applying pressure or tension to a second section of the magnetocaloric material, wherein the first and second sections of the magnetocaloric material are different sections;
   moving the magnetocaloric material and applying the pressure or tension to the first section of the magnetocaloric material and applying the external magnetic field to the second section of the magnetocaloric material,
   wherein the application of the external magnetic field and the application of the pressure or tension cause a periodic temperature change in the magnetocaloric material, wherein periods of lower temperature can be used for cooling.

12. The method of claim 11, wherein the generation of the external magnetic field comprises an adiabatic magnetization, the application of pressure comprises a pressure buildup and a pressure drop, the method further comprising:
   adiabatic demagnetizing;
   absorbing of heat from a cooling chamber; and
   releasing of heat into a surrounding area.

* * * * *